United States Patent [19]

Takemura

[11] Patent Number: 4,842,531

[45] Date of Patent: Jun. 27, 1989

[54] CONNECTOR FOR FOLDABLE ELECTRONIC APPARATUS

[75] Inventor: Shigekazu Takemura, Nara, Japan

[73] Assignee: Sharp Kabushiki Kaisha, Osaka, Japan

[21] Appl. No.: 204,077

[22] Filed: Jun. 8, 1988

[30] Foreign Application Priority Data

Jun. 26, 1987 [JP] Japan .................... 62-98755

[51] Int. Cl.$^4$ .................................... H01R 13/502
[52] U.S. Cl. ............................ 439/165; 16/223;
16/366; 364/708; 439/492; 341/22
[58] Field of Search ............ 16/223, 366; 340/365 R;
364/708, 712; 439/165, 492, 894

[56] References Cited

U.S. PATENT DOCUMENTS 4,517,660 5/1985 Fushimoto et al. ............ 340/365 R

Primary Examiner—Gary F. Paumen
Attorney, Agent, or Firm—Flehr, Hohbach, Test, Albritton & Herbert

[57] ABSTRACT

A connector for an electronic apparatus with two cabinets which are foldable with respect to each other is shaped like a plate and is rotatably connected to these two cabinets around shafts which are inserted into holes formed on mutually opposite edge sections of the connector. A throughhole is formed perpendicularly to the shafts such that a connecting sheet for electrically connecting the two cabinets can be passed therethrough.

3 Claims, 3 Drawing Sheets

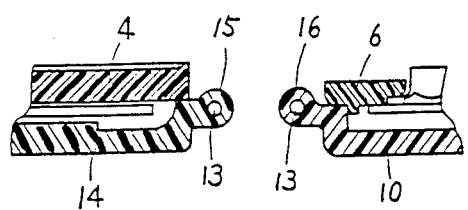
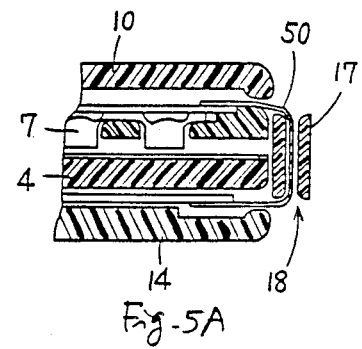
Fig. 4A
Fig. 5A
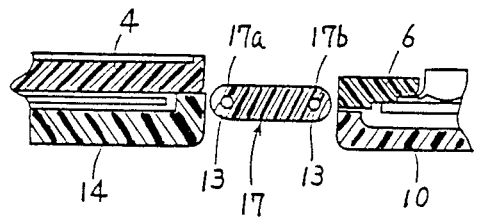
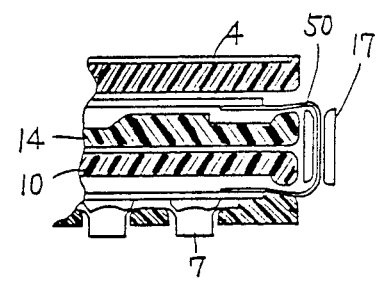
Fig. 4B
Fig. 5B
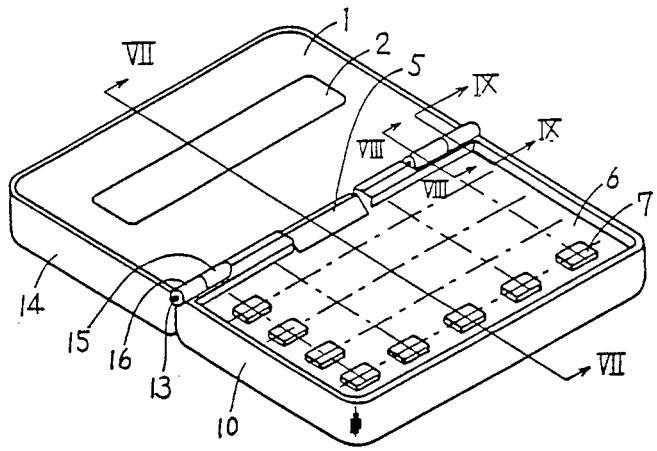
Fig. 6 (Prior Art)

CONNECTOR FOR FOLDABLE ELECTRONIC APPARATUS

BACKGROUND OF THE INVENTION

This invention relates to a connector for an electronic apparatus and more particularly to a connector for a foldable electronic apparatus with two cabinets rotatably connected through axes.

In what follows, a foldable electronic apparatus which was previously designed will be described in detail by way of FIGS. 6–9 such that the objects and distinctive characteristics of the present invention will be more clearly understandable. As shown in FIG. 6, such a foldable electronic apparatus is comprised of a display cabinet 14 and a key cabinet 10 which are rotatably connected to each other such that one can be opened and closed with respect to the other. To make this connection, the display cabinet 14 is provided at its joint with tubular protruding pieces 15 as more clearly shown in FIG. 8 which is a sectional view taken along the line VIII—VIII and the key cabinet 10 is likewise provided at its joint with tubular protruding pieces 16 as more clearly shown in FIG. 9 which is a sectional view taken along the line IX—IX such that shafts 13 which penetrate these tubular pieces 15 and 16 arranged in colinear relationship serve to rotatably engage the protruding pieces 15 and 16 and therefore the display cabinet 14 and the key cabinet 10, thereby forming a foldable cabinet unit.

The display cabinet 14 is provided with an ornamental film sheet 1 with a transparent section 2. The key cabinet 10 contains an interior cabinet 6 provided with input keys 7. The display cabinet 14 and the key cabinet 1 are electrically connected to each other through a flexible circuit board 5.

As shown in FIG. 7 which is a sectional view of the apparatus of FIG. 6 taken along the line VII—VII, the display cabinet 14 is further provided with an operating element 9, a printed circuit board 12, a liquid crystal display device 3 and an inner cabinet 4. They are all covered by the ornamental film sheet 1, the transparent section 2 of the film sheet 1 covering the liquid crystal display device 3. The key cabinet 10 is also provided with a printed circuit board 11 with junction points (not shown) thereon such that a key input is accomplished when one or more of the keys 7 are pressed and junction point or points 8 corresponding to the pressed key or keys 7 come into contact with them. The inner cabinet 6 of the key cabinet 10 serves to protect the printed circuit board 11, junction points 8, etc. The flexible circuit board 5 is electrically connected to both of the printed circuit boards 11 and 12. The double-headed arrow of FIG. 7 indicates how the display cabinet 14 and the key cabinet 10 can be folded together.

One of the disadvantages of an electronic apparatus thus structured as shown in FIGS. 6–9 is that it can be opened only up to 180°. Thus, even when one of the cabinets 10 and 14 is required for an operation, a working area large enough for both cabinets is required. Moreover, since the shafts 13 are subjected to a large stress when the cabinet unit is opened to 180°, the cabinets 10 and 14 must be strongly built. This has the unfavorable consequence of the apparatus becoming inconveniently large.

SUMMARY OF THE INVENTION

It is therefore an object of the present invention to provide a connector for a foldable electronic apparatus with which the apparatus can be operated in one-half of the working area required by an apparatus of the previous design described above.

A connector embodying the present invention for a flexible electronic apparatus with which the above and other objects can be achieved is characterized as being formed in the shape of a plate and provided with a first set of shaft-accepting holes near one side thereof for establishing a rotatable connection with one of the cabinets and a second set of shaft-accepting holes near the opposite side thereof for similarly establishing a rotatable connection with the other of the cabinets. A connecting sheet for establishing an electrical connection between the two mutually foldable cabinets is passed through this plate-like connector. With a connector thus structured, each of the two cabinets connected thereby can be rotated by 180° with respect thereto. In other words, the two cabinets can be rotated by 360° with respect to each other to bring the apparatus into an outwardly folded-up position.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIGS. 4A and 4B are sectional views of portions of the electronic apparatus of FIG. 1 taken along the lines IVA—IVA and IVB—IVB, respectively, FIGS. 5A and 5B are sectional views of the connecting part of the electronic apparatus of FIG. 1 when it is closed and when it is opened by 360°, respectively, FIG. 6 is a diagonal external view of a foldable electronic apparatus according to a previous design.

DETAILED DESCRIPTION OF THE INVENTION

Figure 1:
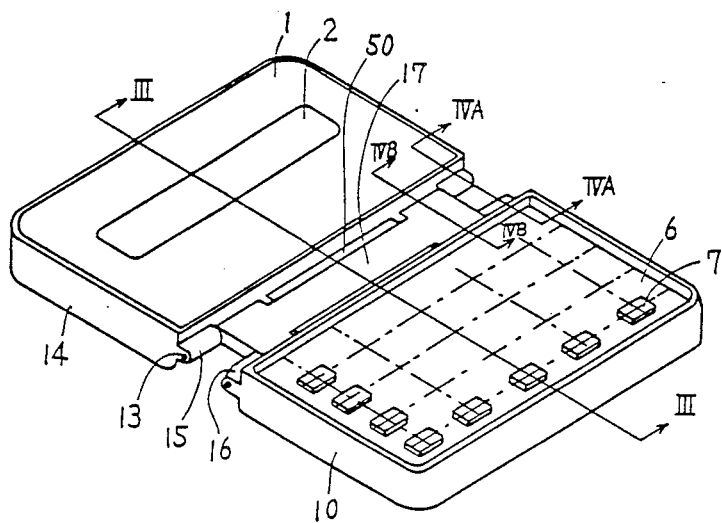
FIG. 1 is a diagonal external view of a foldable electronic apparatus incorporating a connector embodying the present invention when it is opened.

A foldable electronic apparatus incorporating a connector embodying the present invention is described by way of FIGS. 1–5 wherein components which are substantially identical or at least similar to those already described in connection with FIGS. 6–9, such as the two connected cabinets 14 and 10 and the tubular pieces 15 and 16 protruding therefrom, are indicated by the same numerals and not explained again. The tubular pieces 15 and 16, however, are not arranged in coaxial relationship. Instead, a connector 17 is disposed between the display cabinet 14 and the key cabinet 10 and is rotatably connected to both. The manner in which the connector 17 is connected to the cabinets 10 and 14 is explained in detail below.

Figure 2:
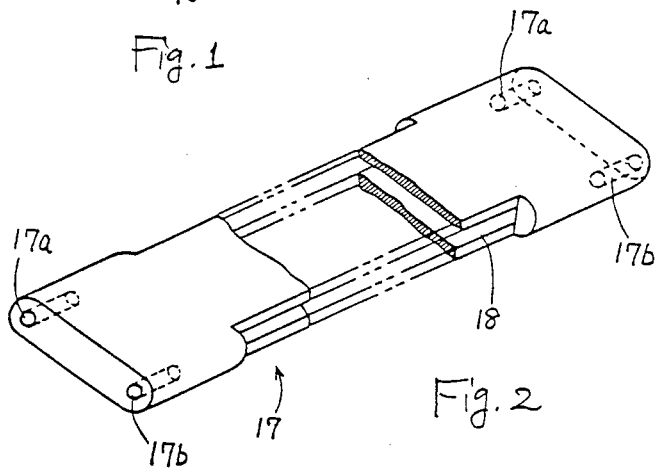
FIG. 2 is a diagonal external view of a connector embodying the present invention.
Figure 3:
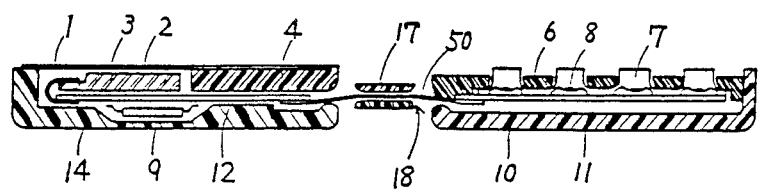
FIG. 3 is a sectional view of the electronic apparatus of FIG. 1 taken along the line III—III.
Figure 7:
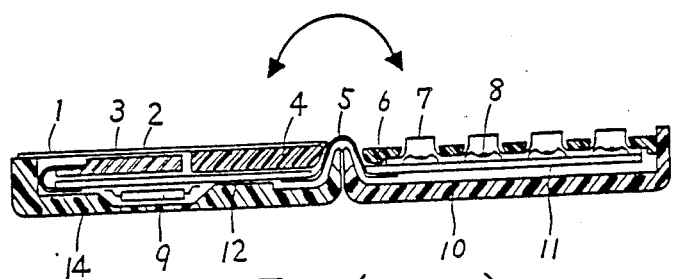
FIG. 7 is a sectional view of the electronic apparatus of FIG. 6 taken along the line VII—VII.
Figure 8:
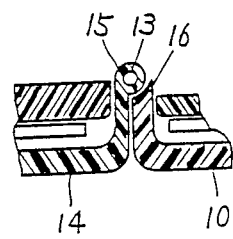
FIGS. 8 and 9 are sectional views of portions of the electronic apparatus of FIG. 6 taken along the lines VIII—VIII and IX—IX, respectively.
Figure 9:
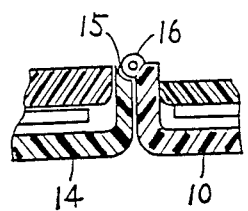

As shown in FIG. 2, the connector 17 embodying the present invention is shaped like a plate and on each of its mutually opposite end surfaces there is a first shaft-accepting hole 17a near one edge and a second shaft-accepting hole 17b near the opposite edge such that the first shaft-accepting holes 17a are aligned with the tubular pieces 15 protruding from the display cabinet 14 and the second shaft-accepting holes 17b are aligned with the tubular pieces 16 protruding from the key cabinet 10. Shafts 10 inserted through these tubular pieces 15 and 16 are accepted in these holes 17a and 17b such that the connector 17 is rotatably connected both to the display cabinet 14 and to the key cabinet 10. A throughhole 18 is provided to the connector 17 in the direction from one to the other of the aforementioned edges such that a flexible connecting sheet 50 for electrically connecting the cabinets 10 and 14 shown in FIG. 1 can be inserted therethrough as shown more clearly in FIG. 3. The other components shown in FIG. 3 such as the printed circuit boards 11 and 12 are substantially identical to those shown in FIG. 7 and do not require explanation.

Connection of the connector 16 to the two cabinets 10 and 14 is described further in detail by way of FIGS. 4A and 4B. As explained briefly in connection with FIG. 1 above, the tubular pieces 15 and 16 are provided respectively to the display cabinet 14 and the key cabinet 10 protrudingly toward each other and shafts 13 are engagingly inserted through these tubular pieces 15 and 16. The shaft-accepting holes 17a and 17b formed in the connector 17 are in coaxial relationships with the tubular pieces 15 and 16, respectively, as can be understood by carefully comparing FIGS. 4A and 4B. The shafts 13 inserted through the tubular pieces 15 and 16 are therefore engagingly accepted in the holes 17a and 17b respectively, such that the cabinets 10 and 14 are separately connected to the connector 17 rotatably therearound.

When the cabinets 10 and 14 thus connected rotatably through the connector 17 are closed, the sectional view of the apparatus is as shown in FIG. 5A and when they are opened by 360° such that the cabinets 10 and 14 touch each other in back-to-back relationship, its sectional view is as shown in FIG. 5B. It is to be noted firstly that such folding by 360° was not possible with a connector of the type previously considered and shown in FIGS. 6-9 and secondly that the connecting sheet 50 is bent by smaller angles than was the case with the previously designed apparatus described in FIGS. 6-9. Thus, the burden on the connecting sheet 50 is much lighter than that on the comparable component shown at 5 in FIGS. 6 and 7. As a result, a longer lifetime can be expected of this connecting sheet 50. Moreover, it goes without saying that the apparatus incorporating the connector 17 of the present invention is extremely advantageous because, when the user has only to operate on one of the cabinets, the apparatus can be opened by 360° and does not require a large area to occupy. Still another advantage of the connector 17 herein disclosed is that the shafts 13 are not subjected to a large stress because the cabinets 10 and 14 are rotated by 360° instead of 180°. As a result, the cabinets 10 and 14 need not be made big in order to make them stronger, and hence the apparatus can be made smaller. Although the connecting sheet 50 is required to be longer than the flexible circuit board 5 of FIGS. 6 and 7, it is inside the throughhole 18 of the connector 17 and hence is safely protected against external forces.

The foregoing description of a preferred embodiment of the invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

What is claimed is:

1. A connector for a foldable electronic apparatus having a first apparatus part and a second apparatus part which are connected to each other rotatably around shafts, the improvement wherein said connector comprises a plate-like shaped body having first and second edge sections at opposite sides thereof, first shaft-accepting holes being formed in said first edge section and second shaft-accepting holes being formed in said second edge section such that said connector and said first apparatus part can be rotatably connected by and around shafts which are inserted into said first shaft-accepting holes and that said connector and said second apparatus part can be rotatably connected by and around shafts which are inserted into said second shaft-accepting holes, a throughhole being provided to said plate-like shaped body from said first edge section to said second edge section for allowing a connecting sheet which electrically connects said first and second apparatus parts to pass therethrough.

2. The connector of claim 1 wherein said first and second shaft-accepting holes are parallel to each other but not colinear.

3. The connector of claim 1 wherein said shaft-accepting holes are substantially perpendicular to said throughhole.

* * * * *